(12) United States Patent
Notheis

(10) Patent No.: US 6,766,117 B2
(45) Date of Patent: Jul. 20, 2004

(54) NETWORK SYSTEM

(75) Inventor: Thomas Notheis, Schramberg (DE)

(73) Assignee: TRUMPF Laser GmbH + Co. KG, Schramberg (DE)

( * ) Notice: Subject to any disclaimer, the term of this patent is extended or adjusted under 35 U.S.C. 154(b) by 484 days.

(21) Appl. No.: 09/833,020

(22) Filed: Apr. 11, 2001

(65) Prior Publication Data

US 2002/0018257 A1 Feb. 14, 2002

(30) Foreign Application Priority Data

Apr. 13, 2000 (DE) .......................................... 100 18 422

(51) Int. Cl.$^7$ ........................ H04B 10/08; H04B 10/00; H04B 10/04
(52) U.S. Cl. ........................... 398/197; 398/15; 398/165
(58) Field of Search ............................ 398/15, 19, 165, 398/197

(56) References Cited

U.S. PATENT DOCUMENTS

| | | | |
|---|---|---|---|
| 5,268,975 A | 12/1993 | Yoshitani et al. | 385/22 |
| 5,491,572 A * | 2/1996 | Ohara | 398/15 |
| 5,615,033 A * | 3/1997 | Yoshida et al. | 398/15 |
| 6,323,973 B1 * | 11/2001 | Hongou | 398/15 |
| 6,359,709 B1 * | 3/2002 | DeCusatis et al. | 398/5 |

FOREIGN PATENT DOCUMENTS

| | | |
|---|---|---|
| DE | 197 22 415 | 12/1998 |
| DE | 197 37 094 | 3/1999 |

* cited by examiner

Primary Examiner—Leslie Pascal
Assistant Examiner—Dzung Tran
(74) Attorney, Agent, or Firm—Barry R. Lipsitz; Douglas M. McAllister

(57) ABSTRACT

The invention provides a network system for laser processing, comprising at least two laser devices and a workstation with a laser processing head which can be operated safely. A first light guide leads from the first laser device to a first connection element, associated with which is a first communication connection element connected to the laser controller of the first laser device. A second light guide leads from the second laser device to a second connection element, associated with which is a second communication connection element connected to the laser controller of the second laser device. The laser processing head can be connected to one of the connection elements by a mating connection part. A safety circuit of the workstation ensures that each laser controller releases the shutter switch only if the safety circuit is connected to the communication connection element connected to the respective laser controller.

24 Claims, 7 Drawing Sheets

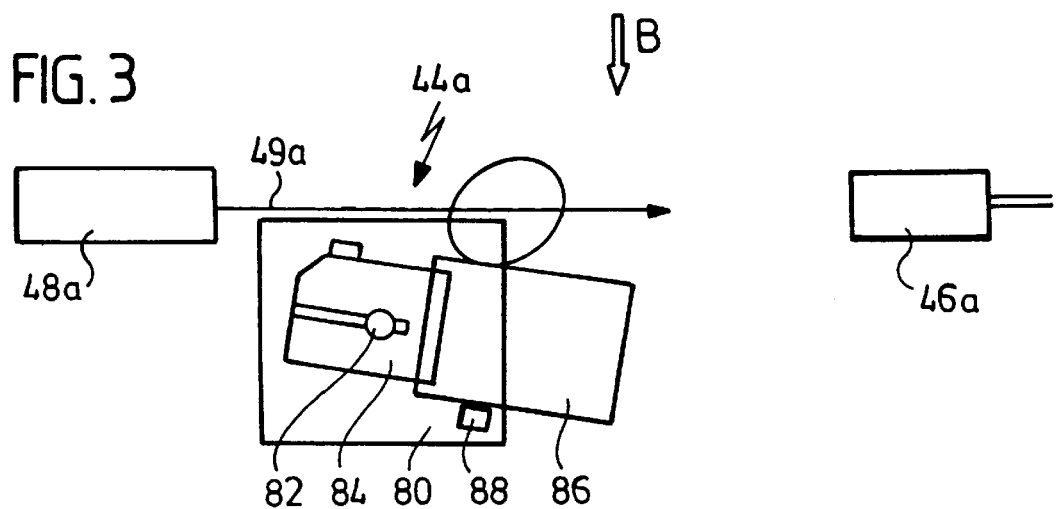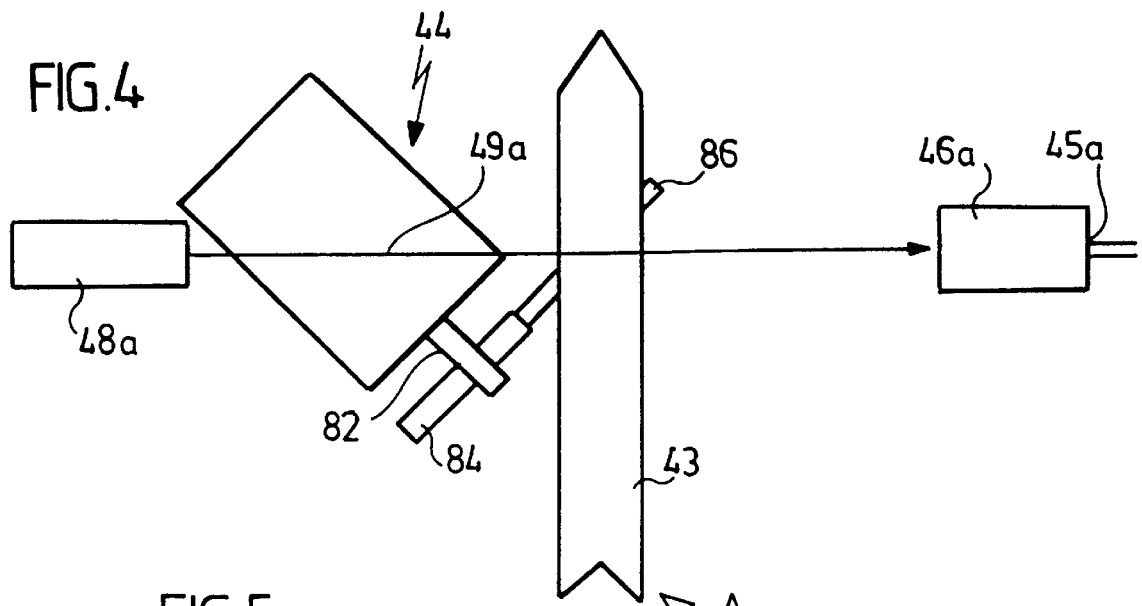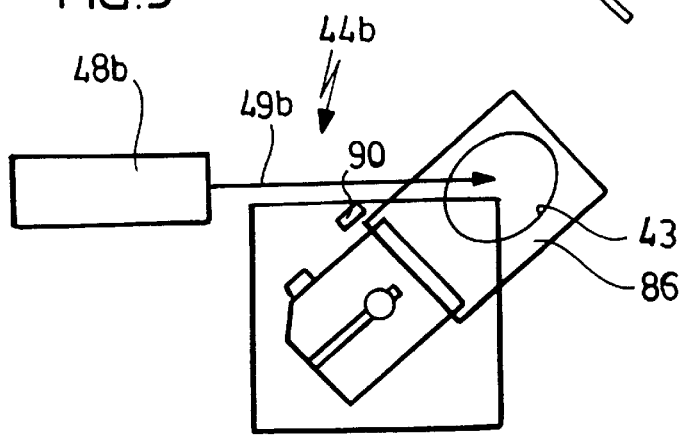

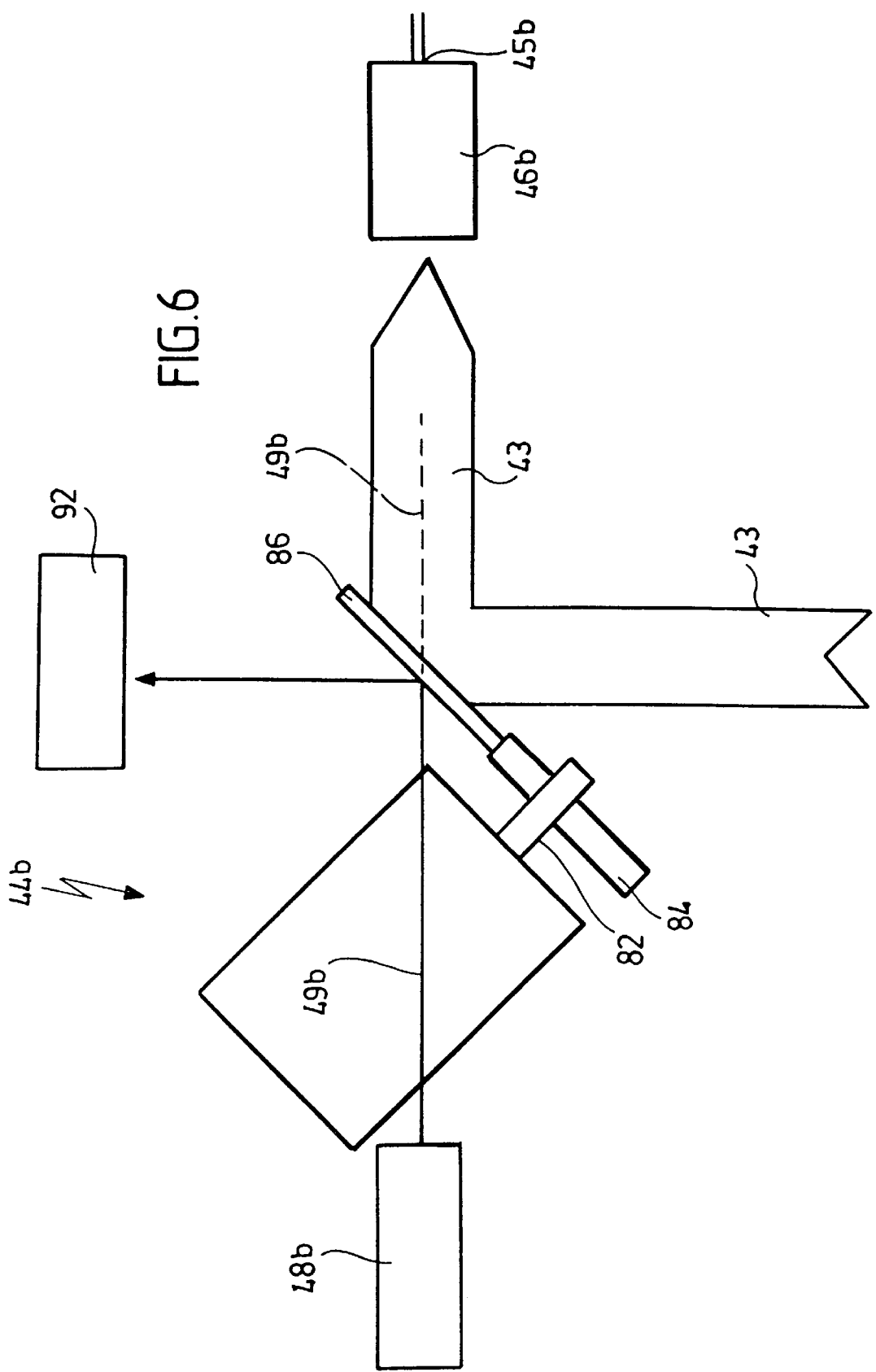

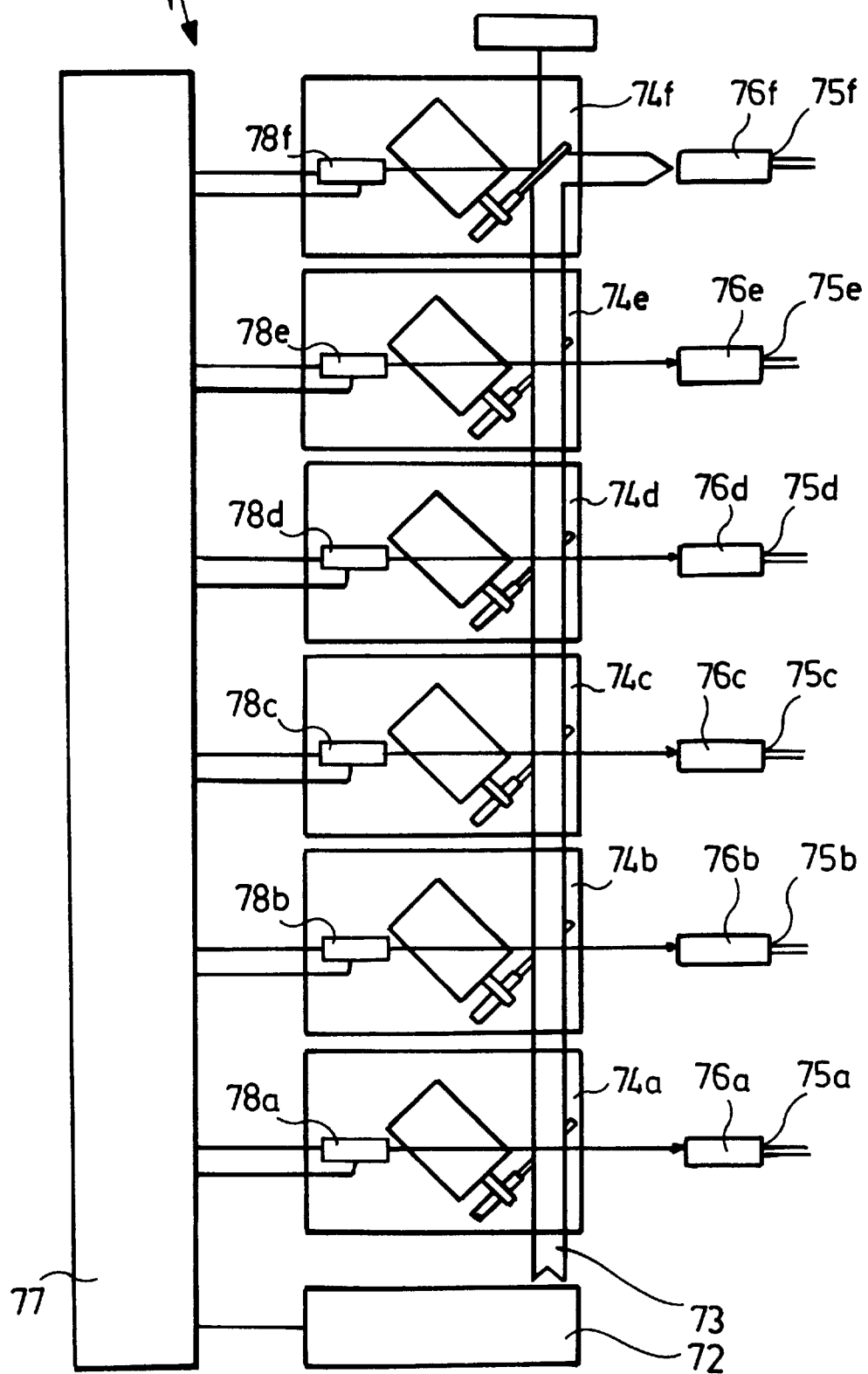

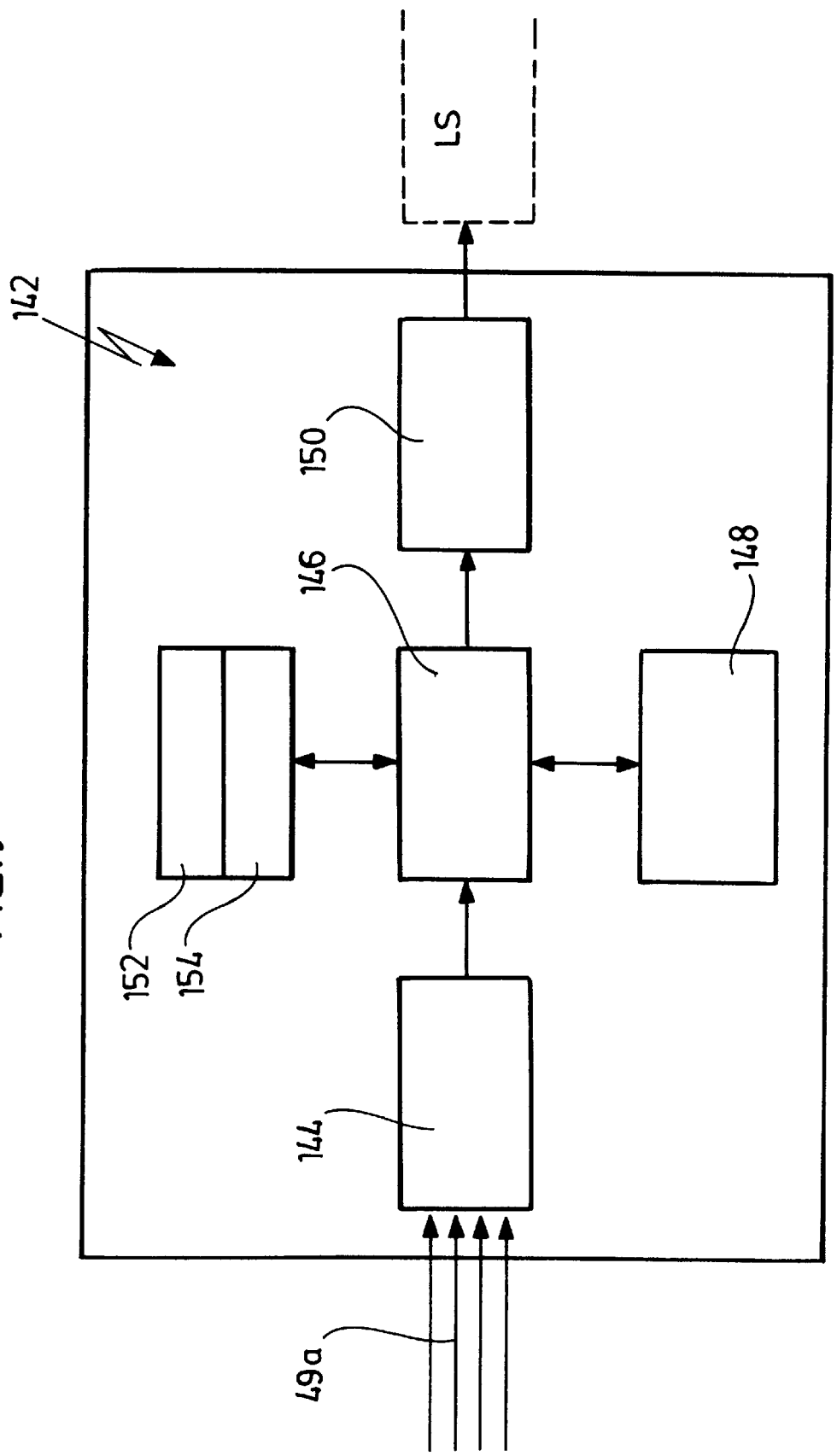

NETWORK SYSTEM

BACKGROUND OF THE INVENTION

The invention relates to a network system for laser processing, in particular for industrial production installations, comprising at least a first and a second laser device, each of which has a laser radiation source, at least one output for the laser radiation, a shutter switch disposed between the respective output and the laser radiation source and a laser controller, and also comprising at least one workstation with at least one laser processing head.

Network systems of this type are known from the prior art. However, with these there is the problem of ensuring that the laser radiation from the laser radiation source is only sent to the workstation when the latter has been made safe.

In the case of the known network systems of this type, it is occasionally necessary to change the laser radiation supply to the laser processing head, that is to say the laser processing head initially receives laser radiation from one laser device, but in the case of maintenance work on this laser device or a technical problem on this laser device it is necessary to change to the other laser device, the change from one laser device to the other being carried out manually, since it does not occur very often.

However, this manual change from one laser device to the other entails considerable safety risks.

It is therefore an object of the invention to form a network system of the type described at the beginning in such a way that it can be operated safely.

SUMMARY OF THE INVENTION

According to the invention, this object is achieved in the case of a network system of the type described at the beginning by a first light guide, which is led from the output of the first laser device to an optical connection element associated with the workstation, being provided, by a first communication connection element, which is connected to the laser controller of the first laser device via a first communication line, being locally associated with the first optical connection element, by a second light guide, which is led from the output of the second laser device to a second optical connection element associated with the workstation, being provided, which a second communication connection element, which is connected to the laser controller of the second laser device via a second communication line, is locally fed to the second optical connection element, by the laser processing head being capable of being connected to the first or second optical connection element by means of a mating optical connection part, by a safety circuit, which is capable of being connected to the first or second communication connection element via a mating communication connection part, being associated with the workstation, by a mechanical blocking device, which allows only the mating optical connection part and the mating communication connection part to be connected to the first or second optical connection element and the respectively associated first or second communication connection element, being provided and by each laser controller blocking a closing of the shutter switch of the corresponding laser device if the safety circuit is not connected to the respective communication connection element, and releasing the shutter switch only if the safety circuit of the workstation is connected to the communication connection element connected to the respective laser controller and is not itself emitting a stop signal.

A closing of the shutter switch is understood for the purposes of this invention as meaning that a light path from the laser radiation source to the corresponding output is allowed, so that the laser radiation is passed to the output, while an opening of the shutter switch means that the light path is interrupted, that is to say the laser radiation does not reach the output.

It is consequently to be regarded as the advantage of the solution according to the invention that, in spite of the fact that two optical connection elements of two different laser devices are associated with the workstation, it is not possible to connect the mating optical connection part of the laser processing head to the optical connection element of the one laser device while the mating communication connection part is connected to the communication connection element of the other laser, so that the other laser, to the optical connection element of which the mating optical connection part is not connected, monitors the safety functions of the workstation, in particular the safety circuit of the same, and consequently this laser controller releases its shutter switch as long as the safety circuit does not emit a stop signal, so that, in principle, it could be possible for this laser device to send laser radiation to the optical connection element although the mating connection part is not connected to it.

The converse case is also avoided, that is that the laser device sends laser radiation to that workstation to the optical connection element of which the mating optical connection part is connected but without the laser controller monitoring the safety functions.

In principle, the blocking device may be formed in a wide variety of ways.

For example, the blocking device may be effective between the communication connection element and the optical connection element and be formed for example in such a way that the mating communication connection part can only be connected to the communication connection element if the mating optical connection part is already connected to the associated optical connection element, or vice versa.

However, a solution which is particularly simple mechanically provides that the blocking device is formed as a mechanical connecting element of a specific length between the mating optical connection part and the mating communication connection part and that the first optical connection element and the second communication connection element and also the second optical connection element and the first communication connection element are at a distance from one another which is greater than the length of the connecting element.

Consequently, the connecting element ensures that, whenever for example the mating optical connection part has been brought into connection with the first or second optical connection element, the mating communication connection part can only be brought into connection with the associated communication connection element, since the other communication connection element is so far away that the connecting element no longer allows it to be inserted.

No details have previously been specified regarding the form of the safety circuit. The safety circuit is preferably formed in such a way that it always emits a stop signal when a working area safety device of the workstation is activated.

Such activation of a working area safety device only takes place if, for example, an access to the workstation is open.

A particularly advantageous variant of the solution according to the invention provides that a processing controller is associated with the workstation, that the processing controller is connected to the mating communication connection part and receives information for the identification of the laser device via the communication connection element connected to the mating communication connection part.

This solution has the great advantage that the connection of the mating communication connection part to the corresponding communication connection element simultaneously enables the processing controller to detect which laser device is supplying the laser radiation arriving at the optical connection element and consequently enables it to select and activate the corresponding laser device.

This solution consequently makes it possible to eliminate the possibility of the processing controller actuating a laser device which is not at all capable of supplying laser radiation for the communication connection element connected to the mating communication connection part on account of erroneous existing information or erroneously entered information.

It is even more advantageous if the processing controller receives information for the identification of the output of the laser device and consequently concerning the light path via the communication connection element.

A further advantageous exemplary embodiment of the solution according to the invention provides that the processing controller communicates directly with the respective laser controller, via the mating communication connection part connected to the respective communication element and via the communication line, in order to control the laser device for the processing.

This solution makes considerably faster interaction possible, on account of the direct communication between the processing controller and the laser controller, and consequently saves unnecessary control times.

In addition, this solution inevitably ensures that the processing controller only addresses the laser controller that is capable of supplying laser radiation for the laser processing head controlled by the processing controller.

Consequently, erroneous activations of other laser devices, particularly including those caused by programming errors or direct input errors, are prevented.

As an alternative or addition to the embodiments described above, a particularly advantageous exemplary embodiment of a network system according to the invention provides that a light path monitoring system is associated with the workstation and makes it possible to detect whether there is a continuous light path present between the respective shutter switch and the laser processing head.

A direct light path monitoring system of this type has the advantage of avoiding the situation which may still occur with the exemplary embodiments described above, that is that, although the mating communication connection part is connected to the communication connection element, the mating optical connection part is not connected to the optical connection element, or the connection between the mating optical connection part and the optical connection element has not been properly made, so that the laser radiation is not coupled into the laser processing head, or only to an inadequate degree.

Errors of this type can be directly detected when using a light path monitoring system according to the invention.

A light path monitoring system of this type is preferably formed in such a way that it makes it possible to detect whether the mating optical connection part is correctly connected to one of the optical connection elements.

A detection of this type can be inquired for example by means of limit switches which are operated by mechanical elements and detect whether the mating optical connection part and the optical connection element are connected to each other in the way intended.

As an alternative or addition to the exemplary embodiments so far described, a network system which is particularly advantageous with regard to safety aspects provides that pilot radiation can be coupled into the light path in each of the laser devices.

Pilot radiation of this type on the one hand allows the light path to be checked and on the other hand allows a check to be made on how the laser radiation is emerging from the laser processing head.

Pilot radiation of this type is preferably of such a low power that the pilot radiation itself does not constitute any safety or health risk.

For example, it would be conceivable to use the pilot radiation at a wavelength which is not visible. In this case, the path of the pilot radiation would have to be made visible, for example by an operator, by auxiliary means, such as for example fluorescent objects or vapor with fluorescent substances.

However, it is particularly advantageous if the pilot radiation is in the range of wavelengths visible to the human eye.

Consequently, an operator has the possibility on the one hand of checking with the naked eye whether a continuous light path from one of the laser devices to the laser processing head exists and on the other hand of detecting how the laser processing head will also later guide and align the laser radiation of the laser device.

However, apart from the simple detection of the pilot radiation with the human eye, the pilot radiation can also be used for transmitting information.

For example, the pilot radiation of different laser devices may have a different wavelength, which makes it possible to identify the origin of the pilot radiation just with the naked eye, from the different color.

Since, however, pilot radiation is only available at low cost with what are known as pilot lasers, which operate in a range of visible wavelengths, it is preferably provided that the pilot radiation is information-modulated.

The information modulation of the pilot radiation can in this case be performed in a wide variety of ways.

It is particularly favorable if the pilot radiation coupled into the light path in each laser device is modulated device-specifically, that is to say has a modulation specifically for each device, so that the laser device can be detected on the basis of this modulation of the pilot radiation.

It is even more advantageous if the pilot radiation is modulated output-specifically, that is to say it can be detected from the pilot radiation from which output of which laser device this pilot radiation originates, so that an operator can directly identify the output of the laser device on the basis of detecting the pilot radiation.

With regard to the modulation of the pilot radiation, there continues therefore to be a wide variety of conceivable possibilities. For example, it is conceivable to modulate the pilot radiation with regard to its wavelength, the wavelength modulation either being such that it is not directly visible to the eye or such that it is visible to the naked eye as color modulation.

However, it is even more simple than a frequency modulation or wavelength modulation if the pilot radiation is intensity-modulated.

Such a modulation of the intensity of the pilot radiation can likewise be performed either by the modulation being carried out with the naked eye, for example as rapid blinking or slow blinking, or else for example as flashing, that is to say brief intensity maxima alternating with long intensity minima.

However, it is also conceivable to carry out the intensity modulation in such a way that it cannot be detected with the naked eye.

No details have previously been specified regarding the coupling of the pilot radiation into the light path. It is particularly favorable if the pilot radiation in the laser device is coupled into the light path ahead of the output, since it is consequently ensured that the pilot radiation runs through the entire light path and consequently that defects in the light path or poor connections in the light path can be detected on the basis of the pilot radiation.

A particularly favorable solution provides that the pilot radiation can be coupled into the light path at the shutter switch, so that the entire light path from the shutter switch can be traced directly on the basis of the pilot radiation.

It is particularly favorable if the shutter switch is constructed in such a way that the pilot radiation can be coupled into the light path without additional optical elements.

Furthermore, as the last component switching the laser radiation, for example with a deflecting element, the shutter switch offers the possibility of coupling in the pilot radiation in a simple way.

In principle, it would be conceivable in the exemplary embodiments described so far to guide the pilot radiation on its own or to guide the pilot radiation together with the laser radiation, so that it would always be possible to detect from the pilot radiation the path or impingement of the laser radiation on the workpiece or other locations of the workstation.

However, it is particularly favorable if the coupling-in of the pilot radiation can be switched with the shutter switch and the pilot radiation is coupled into the light path when the shutter switch is in the open position, that is to say is interrupting the light path.

This solution has the great advantage that an operator can consequently detect with the naked eye, just from the existence of the pilot radiation, that no laser radiation can come from the laser radiation source via this light path at this moment, since the presence of the pilot radiation is a clear indication that the shutter switch is open and is consequently not capable of coupling laser radiation from the laser radiation source into the light path.

It is particularly suitable in this case if the shutter switch in the closed position interrupts the coupling-in of the pilot radiation. For example, in this case it is conceivable for the shutter switch to deflect the pilot radiation.

Consequently, the absence of the pilot radiation is an indication to the operator that laser radiation may arrive at the laser processing head.

With regard to the possibilities for sensing the pilot radiation, no additional possibilities beyond the simple detection of the pilot radiation by an operator have been presented in connection with the explanation so far of the individual exemplary embodiments.

Consequently, an advantageous solution provides that the pilot radiation can be detected by a detector of an information acquisition device and that the information contained in the pilot radiation can be ascertained by the information acquisition device from the modulation of the pilot radiation.

It is to be regarded as the advantage of this solution that the pilot radiation can consequently be modulated in such a way that the modulation cannot be detected with the naked eye, such rapid modulation having the advantage that considerable amounts of information can be transmitted.

An information acquisition device of this type may in principle be formed as a device which is available to the operator and is carried around by the operator and held in the light path of the pilot radiation as and when required, so that the detector can detect said pilot radiation and ascertain the information.

However, it is also conceivable for the information acquisition device to be fixed in the workstation or else for example be associated with the laser processing head.

A particularly advantageous solution envisages that the information acquisition device is able to identify the laser device, so that for example an operator can use the information acquisition device to identify in a simple way the laser device from which the pilot radiation is coming.

It is even more advantageous if the used output of the laser device, and consequently also the light path respectively being used, can also be identified with the information acquisition device.

This can be achieved in a particularly simple way by the information acquisition device being able to display the information ascertained, this is to say for example the information ascertained concerning the identity of the laser device.

With regard to the way in which the pilot radiation is sensed, a wide variety of possibilities are conceivable. For example, it is conceivable for the detector of the information acquisition device to sense scattered light of the light path, so that the detector does not have to be placed directly in the light path.

For example, detectors of this type can be provided not only the light path in the optical connection elements, but also in the mating connection part or else in the laser processing head, in all of which scattered light of the pilot radiation is produced during the transition from one optical element to the other optical element, so that the information transmitted by modulation of the pilot radiation can already be ascertained on the basis of the scattered light, that is to say it is possible for example for the laser device and possibly also the light path to be identified.

Another solution envisages that the laser processing head can be positioned in relation to the detector in such a way that the detector senses the pilot radiation directly.

This solution has the advantage that it allows the pilot radiation to operate with low power, which would for example produce an inadequate intensity for detection in the scattered light but is adequate for ascertainment of the information if the pilot radiation from the laser processing head acts directly on the detector.

Moreover, this solution also has the advantage that gradual defects, such as for example intensity-reducing effects, can be detected by determining the absolute intensity of the pilot radiation.

Such a use of pilot radiation, explained in the above exemplary embodiments, in a network system according to the invention can be employed particularly suitably if the light path monitoring system senses the presence of pilot radiation coupled-in the laser device at the laser processing head.

Such a form of the light path monitoring system consequently allows the light path to be monitored in a simple way to establish whether all the connection elements and mating connection parts are in connection and also whether there is no damage to the optical elements, such as for example the light guides and/or coupling optics.

It is also particularly favorable if the light path monitoring system monitors the presence of pilot radiation coupled-in the laser device at the optical connection, that is to say at the optical connection element or at the mating optical connection part, since these are primarily sources of error when they are to be brought into connection with one another by the operator.

Further features of the invention are the subject of the following description and the graphic representation of a of an exemplary embodiment of a network system according to the invention.

BRIEF DESCRIPTION OF THE DRAWINGS

In the drawing:

FIG. 3 shows a view of a shutter switch in the open state and with a representation of the alignment of the pilot laser in relation to said shutter switch when viewed in the direction of the arrow A in FIG. 4;

FIG. 4 shows a representation of the open shutter switch according to FIG. 3 when viewed in the direction of the arrow B in FIG. 3;

FIG. 5 shows a representation similar to FIG. 3 with the shutter switch closed;

FIG. 6 shows a representation similar to FIG. 4 with the shutter switch closed;

FIG. 7 shows a schematic representation similar to FIG. 2 of a second laser device;

FIG. 8 shows a schematic representation in the form of a detail of a workstation in FIG. 1 with a first laser device and a second laser device for supplying to one of the processing heads and FIG. 9 shows a schematic representation of a block diagram of an information acquisition device according to the invention.

DETAILED DESCRIPTION OF THE INVENTION

Figure 1:
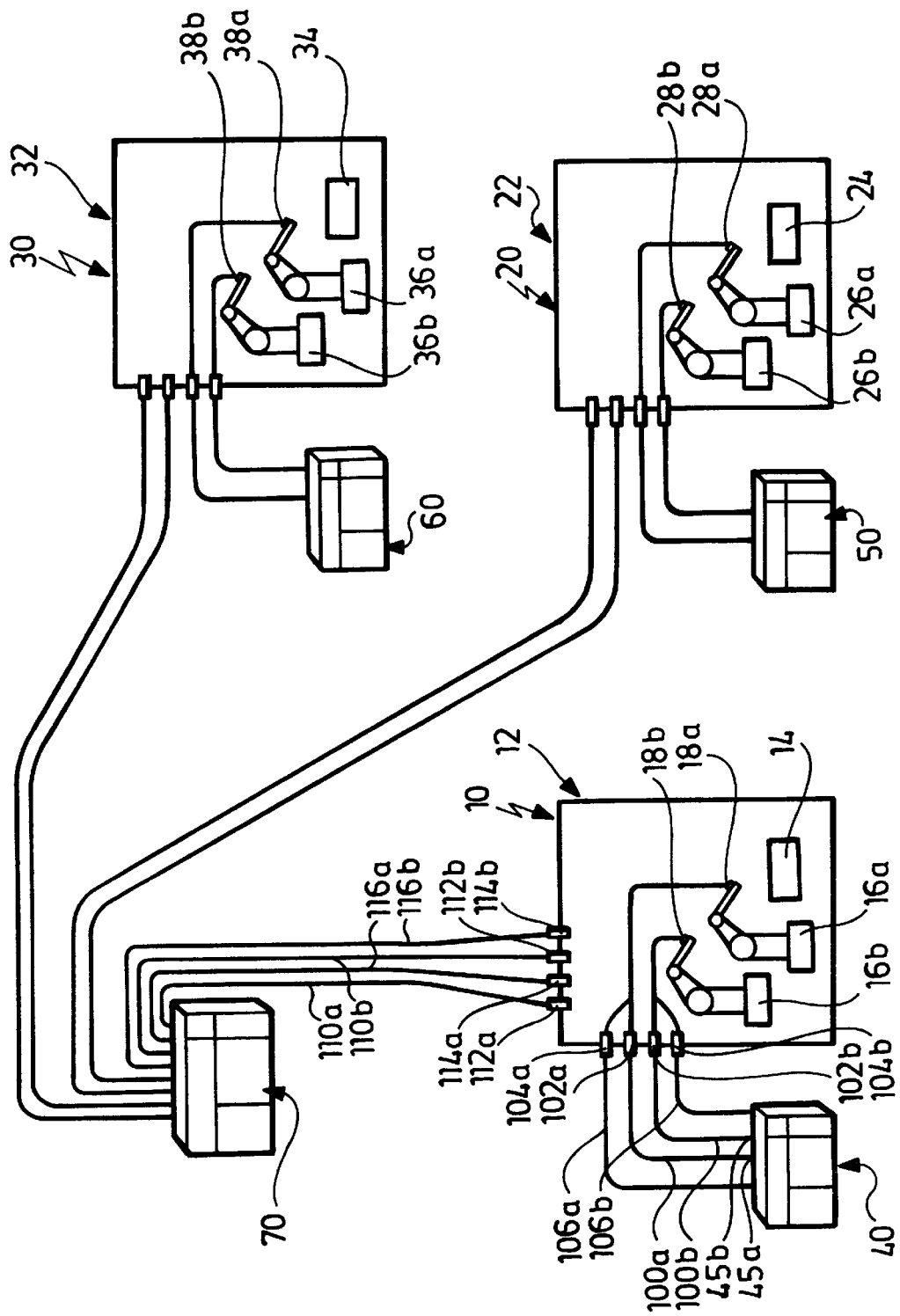
FIG. 1 shows a schematic representation of an exemplary embodiment of a network system according to the invention.

An exemplary embodiment of a network system according to the invention, represented in FIG. 1, for laser processing in an industrial production installation comprises, for example, three workstations 10, 20 and 30, in which laser processing of workpieces 14, 24 and 34 takes place in a closed cubicle 12, 22 and 32.

For the laser processing, two robots 16a, 16b, 26a, 26b, 36a, 36b, each of which can move a laser processing head 18a, 18b, 28a, 28b, 38a, 38b in space, are provided for example in each of the workstation 10, 20, 30, in order to machine the respective workpiece 14, 24, 34 by laser radiation.

The generation of the laser radiation takes place by means of laser devices 40, 50, 60 and 70, the laser devices 40, 50 and 60 primarily supplying the workstations 10, 20 and 30 with laser radiation, while the laser device 70 is provided for cases in which one of the laser devices 40, 50 or 60 is not available, for example on account of a defect or on account of maintenance work.

Figure 2:
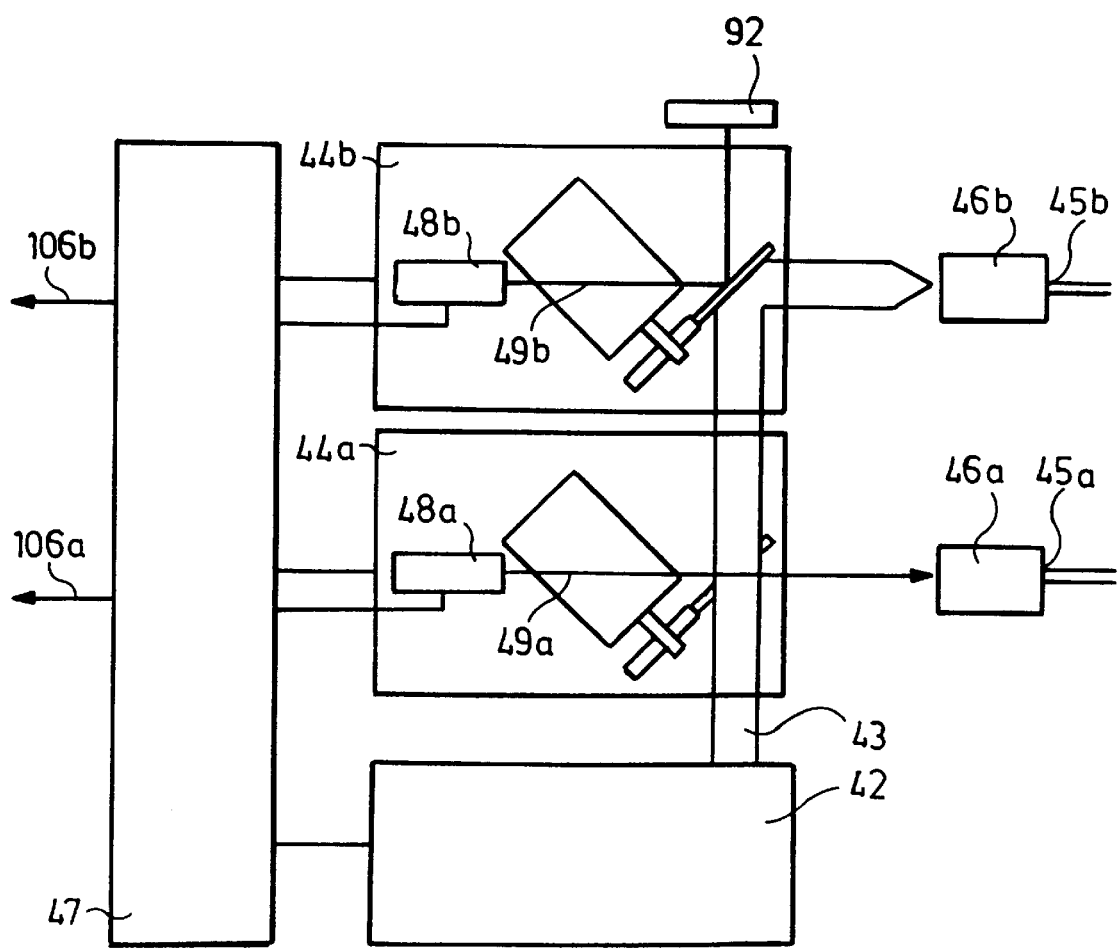
FIG. 2 shows a schematic representation of a construction of a first laser device of the network system according to the invention.

As represented by way of example in FIG. 2 on the basis of the laser device 40, each of the laser devices 40, 50 or 60 comprises a laser radiation source 42, which generates laser radiation 43, which can be coupled into one of two outputs 45a or 45b by shutter switches 44a, 44b arranged in series, each output 45a, 45b having coupling optics 46a and 46b respectively arranged in front of it.

For controlling the laser radiation source 42 and for activating the shutter switches 44a and 44b, a laser controller designated overall by 47 is provided.

Furthermore, also associated with each of the shutter switches 44a and 44b is a pilot laser 48a and 48b, respectively, which generates as laser radiation a pilot radiation 49a and 49b, respectively, which can be coupled into the respective output 45a or 45b as an alternative to the laser radiation 43 by the shutter switches 44a and 44b, as described in detail below.

As represented in FIGS. 3 to 6, each shutter switch 44 has a closure drive 80, which is formed for example as a rotary drive for a shaft 82, on which a mirror 86 is pivotably held by means of a holder 84.

The mirror 86 can for example, as represented in FIGS. 3 and 4, be brought into an ineffective position, in which the holder 84 engages against a stop 88.

In this ineffective position of the mirror 86, the latter allows the laser radiation 43 coming from the laser radiation source 42 to pass uninfluenced and, as represented by the example of the shutter switch 44a in FIG. 2, enter the next shutter switch 44b.

The pilot laser 48a associated with the shutter switch 44a is consequently disposed in such a way that the pilot radiation 49a generated by it propagates within the beam cross section of the laser radiation 43 deflected by the mirror 86 and parallel to the beam axis of the latter radiation, preferably approximately coaxially in relation to the beam axis of the latter radiation, in the direction of the coupling optics 46a, and consequently enters the coupling optics 46a and is coupled into the output 45a.

Consequently, as represented in FIGS. 3 and 4, in the ineffective position of the mirror 86 of the shutter switch 44a, the pilot radiation 49a of the pilot laser 48a is coupled into the output 45a without additional optical elements being required.

If, as represented in FIGS. 5 and 6 by the example of the shutter switch 44b, the mirror 86 is in its effective position, in which it engages against a stop 90, the mirror 86 is subjected to the full cross section of the laser radiation 43 and, as represented in FIG. 6, reflects the laser radiation 43 into the coupling optics 46b, which couple it into the output 45b, the mirror 86 being aligned in such a way that the deflected laser radiation 43 would propagate coaxially in relation to the pilot radiation 49b of the pilot laser 48b, entering the coupling optics 46b, if the said pilot radiation were also to enter the light path.

In the effective position of the mirror 86, the latter is also subjected to the pilot radiation 49b and deflects the pilot radiation 49b in the direction of an absorber 92, on which the laser radiation 43 would impinge if the mirror 86 of the shutter switch 44b were to be in the ineffective position.

Consequently, each of the shutter switches 44a and 44b serves not only for coupling the laser radiation 43 into the corresponding coupling-in optics 46a or 46b when in the closed state, in which the mirror 86 is in the effective position, or for allowing the laser radiation 43 to pass unhindered in the direction of the absorber 92 or of the nearest shutter switch 44 when in the open state, but also at the same time serves for coupling the pilot radiation 49 into corresponding coupling-in optics 46 when in the open state, that is to say the ineffective position of the mirror 86, or for interrupting the coupling-in of the pilot radiation 49 into the coupling-in optics 46 when in the closed state, that is to say the effective position of the mirror 86.

Each of the pilot lasers 48a and 48b is also activated by the laser controller 47 in an intensity-modulated manner, to be precise in such a way that the pilot radiation 49a or 49b has an intensity modulation which corresponds to a coding for the corresponding laser device, that is to say in this case for the first laser device 40.

Furthermore, there is also the possibility of additionally modulating each of the pilot lasers 48a and 48b additionally with a coding corresponding to the shutter switch 44a or 44b, respectively.

As represented in FIG. 7, the laser device 70 is also constructed in the same way in principle as the laser devices 40, 50 or 60, that is to say a laser radiation source 72 is likewise provided for the generation of laser radiation 73, which however can now enter a total of six shutter switches 74a, 74b, 74c, 74d, 74e, 74f placed one behind the other and can be coupled by each of the shutter switches 74a to 74f into the corresponding output 75a to 75f by means of the corresponding coupling-in optics 76a to 76f.

Furthermore, the laser controller 77 serves the purpose of activating on the one hand the laser radiation source 72 and on the other hand the shutter switches 74a to 74f and the pilot lasers 78a to 78f.

In the same way as in the case of the laser devices 40, 60 or 70, each of the pilot lasers 78a to 78f is intensity-modulated with a coding specific to the laser device and possibly also with a coding specific to the respective shutter switch 74a to 74h.

For supplying to the laser processing heads 18a and 18b, first light guides 100a and 100b lead from the outputs 45a and 45b to first optical connection elements 102a and 102b, which are associated with the workstation 10.

Spatially associated with each of the first optical connection elements 102a, 102b is a communication connection element 104a, 104b, which is connected to the laser controller 47 via a communication line 106a, 106b, as represented in FIGS. 1 and 2.

Furthermore, second light guides 110a and 110b are led from the second laser device 70, to be precise from the outputs 75a and 75b, to the workstation 10 and have second optical connection elements 112a and 112b that are associated with the workstation 10.

Associated with each of these second optical connection elements 112a and 112b there is in turn also a communication connection element 114a and 114b, respectively, which is led to the laser controller 77 via a communication line 116a and 116b, respectively.

Figure 8:
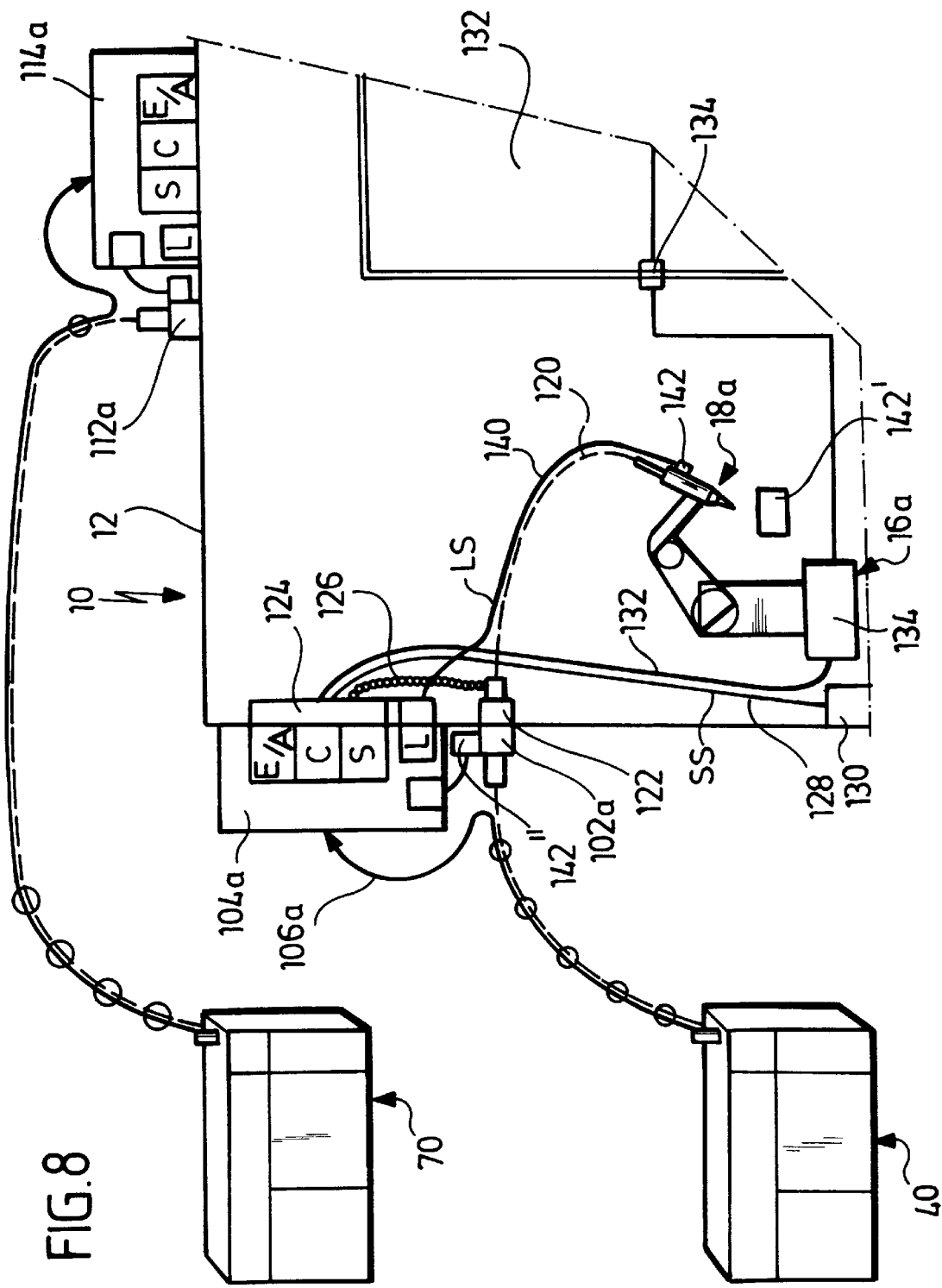

For reasons of simplifying the description, the possibilities for connecting the laser processing head 18a to the first connection element 102a and to the second connection element 112a and the communication connection elements 104a and 114a respectively associated locally with these elements are explained in detail, as represented in FIG. 8, although it would likewise be possible to connect the laser processing head 18a to the first optical connection element 102b or to the second optical connection element 112b by the correspondingly associated communication connection elements 104b and 114b, respectively. This possibility is not discussed in any further detail merely to simplify the description.

As represented in FIG. 8, a light guide 120 leads from the laser processing head 18a to a mating connection part 122, which can be connected either to the first optical connection element 102a or to the second optical connection element 112a manually by an operator.

Furthermore, a mating communication connection part 124, which can be connected either to the first communication connection element 104a or to the second communication connection element 114a, is provided.

The mating optical connection part 122 and the mating communication connection part 124 are mechanically connected to each other, for example by a mechanical blocking element 126, in the simplest case in the form of a connecting chain, in such a way that this blocking element 126 prevents the mating communication connection part 124 from being able to be brought into connection with the second communication connection element 114a while the mating optical connection part 122 is connected to the first optical connection element 102a, or vice versa.

The mating communication connection part 124 is in connection via a line 128 with a safety circuit 130, which serves for making the space enclosed by the cubicle 12 safe.

For example, the safety circuit 130 protects one or more accesses 132 to the cubicle 12 by switches 134, which are operated, that is to say opened, if one of the accesses 132 is opened, so that interruption of the safety circuit 130 takes place and consequently the safety circuit 130 transmits via the line 128 a stop signal S, which is transmitted via a connection over the communication line 106a to the laser controller 47 on account of the connection between the mating communication connection part 124 and the communication connection element 104a.

The laser controller 47 is consequently constructed in such a way that it detects whether a safety circuit 130 is connected to the first communication connection element 104a and also checks then whether the safety circuit is closed, that is to say all the accesses to the working cubicle 12 are closed, and only then releases the open shutter switch 44a for closing, which then, in the closed state, feeds the laser radiation 43 via the output 45a and the light guide 100a to the first optical connecting element 102a.

If the safety circuit 130 is interrupted, that is to say one of the accesses 132 to the working cubicle 12 is open, the safety circuit 130 emits a stop signal SS and this leads to the laser controller 47 opening the shutter switch 44a, that is to say interrupting the coupling-in of the laser radiation 43 into the coupling optics 46a and consequently via the output 45a into the first light guide 100a.

Also connected to the mating communication connection part 124, via a line 132, is a processing controller 134, which can detect via a connection C between the mating communication connection part 124 and the first communication connection element 104a which of the laser devices 40 or 70 is associated with the communication connection element 104a into which the mating communication connection part 124 has been inserted.

At the same time, either a direct communication with the laser controller 47 can take place via the communication line 106a or a code which identifies the correspondingly associated laser device 40 or 70 and possibly also the output 45, 75 of the laser device 40 or 70, and consequently the light path, for the processing controller 134 is already fixed in the communication connection element 104a.

Furthermore, a direct communication between the operating controller 134 and the laser controller 47 takes place via the mating communication connection part 124 and the first communication connection element 104a through the connection E/A, so that the laser radiation source 42 can be operated in a way corresponding to the operation of the laser processing head 18a.

Finally, a light path monitoring takes place via a connection L between the mating communication connection part 124 and the first connection element 104a, the light path monitoring signal LS being transmitted to the laser controller 40 via the communication line 106a.

For example, the light path monitoring system comprises an identification device 142, which is connected to the mating communication connection part 126 via a line 140 and detects for example scattered radiation of the pilot radiation 49a of the pilot laser 48a in the laser processing head 18a.

As represented in FIG. 10, an identification device 142 of this type comprises an optical detector 144, which detects scattered radiation of the pilot radiation 49a and transmits it to a processor 146, which operates together with a memory 148 and is capable of demodulating the intensity-modulated pilot radiation 49a and comparing it with data stored in the memory 148, and consequently of detecting from which of the laser devices 40 or 70 the pilot radiation 49a results, and also possibly of detecting which shutter switch 44a the pilot laser 48a generating the pilot radiation 49a is associated with.

The processor 146 then emits the signal LS for the light path monitoring via an interface 150, for example documenting that the pilot radiation 49a has reached the laser processing head 18a.

If this light path signal LS is transmitted via the line 140 and the mating communication connection part 126 and also the first communication connection element 104a and the communication line 106a to the laser controller 47, the laser controller 47 knows that a continuous light path exists from the shutter switch 44a to the laser processing head 18a and that the shutter switch 44a can be released for closing, unless for example the safety circuit 130 is transmitting a stop signal SS.

To allow the light path monitoring also to be checked by an operator, the identification device 142 is preferably also provided with a display unit 152 and an input unit 154, so that an operator can at the same time detect from which laser device the pilot radiation 49a identified by the identification device 142 originates.

It is also conceivable, however, for the identification device 142 to be disposed in the working cubicle 12 as an identification device 142' and for the laser processing head 18a to be moved up to the fixed identification device 142' for the detecting of the pilot radiation 49a, so that the pilot radiation 49a can be detected directly by the detector 144.

In this case, the fixed identification device 142' is then connected to the mating communication connection part 124 or the processing controller 134 via a line that is not represented in the drawing.

Finally, it is also possible for an identification device 142", which is of an identical construction to the identification device 142, to be associated with the optical connection element 102a or the mating optical connection part 122, and for the scattered radiation of the pilot radiation 49a in these to be detected, so that the laser controller 47 can detect whether the pilot radiation 49a of the pilot laser 48a is at least reaching the first optical connection element 102a or the mating optical connection part 122.

Moreover, it is also conceivable for the identification device 142 to be formed as a portable identification device, which can be carried around by an operator and held in the light path of the pilot beam 49a, for example where it leaves the laser processing head 18a, so that the detector 44 detects the pilot radiation 49a. Consequently, the operator can for example detect by means of the display unit 152 to which of the laser devices 40 or 70 the light path emerging from the laser processing head 18a is leading, and is consequently capable of checking whether the processing controller 134 has correctly detected this laser device 40.

The same functions can be achieved if the mating optical connection part 122 and the mating communication connection part 124 are connected into the second optical connection element 122a and the second communication connection element 114a, respectively. In this case, the same data can be acquired by the laser controller 77 and the operating controller 134 and the same functional features can be checked by the laser controller 77.

What is claimed is:

1. A network system for laser processing, comprising:
   at least a first and a second laser device, each of which has:
      a laser radiation source,
      at least one output for laser radiation,
      a shutter switch disposed between the respective output and the laser radiation source, and
      a laser controller; and
   at least one workstation with at least one laser processing head, wherein:
      a first light guide is provided and led from the output of the first laser device to a first optical connection element associated with the workstation;
      a first communication connection element, coupled to the laser controller of the first laser device via a first communication line, is locally associated with the first optical connection element;
      a second light guide is provided and led from the output of the second laser device to a second optical connection element associated with the workstation;
      a second communication connection element, coupled to the laser controller of the second laser device via a second communication line, is locally associated with the second optical connection element;
      the laser processing head is connectable to the first or second optical connection element by means of a mating optical connection part;
      a safety circuit, connectable to the first or second communication connection element via a mating communication connection part, is associated with the workstation;
      a mechanical blocking device is provided to allow only the mating optical connection part and the mating communication connection part to be connected to the first or second optical connection element and the respectively associated first or second communication connection element; and
      each laser controller blocks a closing of the shutter switch of the corresponding laser device if the safety circuit is not connected to the respective communication connection element, and releases the shutter switch only if the safety circuit of the workstation is connected to the communication connection element connected to the respective laser controller and is not itself emitting a stop signal.

2. A network system according to claim 1, wherein:
   the blocking device comprises a mechanical connecting element of a specific length between the mating optical connection part and the mating communication connection part; and the first optical connection element and the second communication connection element and also the second optical connection element and the first communication connection element are at a distance from one another which is greater than the length of the connecting element.

3. A network system according to claim 1, wherein the safety circuit always emits a stop signal when a working area safety device of the workstation is activated.

4. A network system according to claim 1, wherein:
a processing controller is associated with the workstation; and
the processing controller is connected to the mating communication connection part and receives information for the identification of the laser device via the communication connection element connected to the respective mating communication connection part.

5. A network system according to claim 1, wherein the processing controller communicates directly with the respective laser controller, via the mating communication connection part connected to the respective communication connection element and via the communication line, in order to control the laser device.

6. A network system according to claim 1, wherein a light path monitoring system is associated with the workstation for use in detecting whether there is a continuous light path present between the respective shutter switch and the laser processing head.

7. A network system according to claim 6, wherein the light path monitoring system enables detection as to whether the mating optical connection part is connected to one of the optical connection elements.

8. A network system according to claim 6, wherein the light path monitoring system senses the presence of pilot radiation in the laser device at the laser processing head.

9. A network system according to claim 6, wherein the light path monitoring system monitors the presence of pilot radiation in the laser device at the optical connection.

10. A network system according to claim 1, wherein pilot radiation can be coupled into the light path in each of the laser devices.

11. A network system according to claim 10, wherein the pilot radiation lies in a range of wavelengths visible to the human eye.

12. A network system according to claim 10, wherein the pilot radiation is information-modulated.

13. A network system according to claim 12, wherein the pilot radiation coupled into the light path in each laser device is modulated device-specifically.

14. A network system according to claim 12, wherein the pilot radiation is modulated output-specifically.

15. A network system according to claim 12, wherein the pilot radiation is intensity-modulated.

16. A network system according to claim 10, wherein the pilot radiation in the laser device is coupled into the light path ahead of the output.

17. A network system according to claim 10, wherein the pilot radiation can be coupled into the light path at the shutter switch.

18. A network system according to claim 10, wherein the coupling-in of the pilot radiation can be switched with the shutter switch and the pilot radiation is coupled into the light path when the shutter switch is in an open position.

19. A network system according to claim 18, wherein the shutter switch in a closed position interrupts the coupling-in of the pilot radiation.

20. A network system according to claim 10, wherein:
the pilot radiation is detectable by a detector of an information acquisition device; and
information is ascertainable by the information acquisition device from the modulation of the pilot radiation.

21. A network system according to claim 20, wherein the information acquisition device is able to identify the laser device.

22. A network system according to claim 20, wherein the information acquisition device is able to display the information ascertained.

23. A network system according to claim 20, wherein the detector senses scattered light of the light path.

24. A network system according to claim 20, wherein the laser processing head is positionable in relation to the detector in such a way that the detector directly senses the pilot radiation.

* * * * *